US008584171B2

(12) United States Patent  (10) Patent No.: US 8,584,171 B2
Brownrigg et al.  (45) Date of Patent: Nov. 12, 2013

(54) LOCAL CONTEXT NAVIGATION SYSTEM

(75) Inventors: Richard T. Brownrigg, Castle Rock, CO (US); Robert F. Greene, Lone Tree, CO (US); John C. Beyler, Chappaqua, NY (US); Rebecca R. Lim, Englewood, CO (US); John S. Fukuda, Denver, CO (US); Jonathan Barsook, Woodland Hills, CA (US); Agnes Liu, Walnut, CA (US)

(73) Assignee: Starz Entertainment Group LLC, Englewood, CO (US)

( * ) Notice: Subject to any disclaimer, the term of this patent is extended or adjusted under 35 U.S.C. 154(b) by 859 days.

(21) Appl. No.: 11/381,921

(22) Filed: May 5, 2006

(65) Prior Publication Data

US 2006/0253417 A1  Nov. 9, 2006

Related U.S. Application Data

(60) Provisional application No. 60/678,313, filed on May 6, 2005, provisional application No. 60/678,256, filed on May 6, 2005.

(51) Int. Cl.
  *G06F 3/00* (2006.01)
  *G06F 13/00* (2006.01)
  *H04N 5/445* (2011.01)
(52) U.S. Cl.
  USPC ............... 725/52; 725/37; 725/39; 725/44
(58) Field of Classification Search
  USPC ........... 725/37, 39–41, 44–47, 51–52, 86–87, 725/49, 89
  See application file for complete search history.

(56) References Cited

U.S. PATENT DOCUMENTS

| 5,130,792 A | | 7/1992 | Tindell et al. |
| 5,191,573 A | | 3/1993 | Hair |
| 5,357,276 A | | 10/1994 | Banker et al. |
| 5,523,796 A | * | 6/1996 | Marshall et al. ............... 725/41 |
| 5,530,754 A | | 6/1996 | Garfinkle |
| 5,534,941 A | | 7/1996 | Sie et al. |
| 5,568,181 A | | 10/1996 | Greenwood et al. |

(Continued)

FOREIGN PATENT DOCUMENTS

WO  WO 00/59220 A1  10/2000

OTHER PUBLICATIONS

Ciciora, Walter, et al., Modem Cable Television Technology, Video, Voice, an Data Communications, Morgan Kaufmann Publishers, Inc., 1999, Chapter 16, pp. 659-688.

(Continued)

*Primary Examiner* — Pankaj Kumar
*Assistant Examiner* — Randy Flynn
(74) *Attorney, Agent, or Firm* — Kilpatrick Townsend & Stockton LLP

(57) ABSTRACT

Embodiments of the invention provide methods, systems, and machine-readable media for browsing, navigating and searching a context sensitive entertainment-programming guide. According to one embodiment, a method for navigating an entertainment-programming guide can comprise establishing a connection from a client device to a server computer through a public network. A first content array can be received from the server computer over the public network. The first content array can comprise information describing a plurality of entertainment programs. The first content array can be stored on the client device and entertainment-program information can be presented based on the first content array stored on the client device.

17 Claims, 9 Drawing Sheets

(56) References Cited

U.S. PATENT DOCUMENTS

| | | | |
|---|---|---|---|
| 5,583,560 A * | 12/1996 | Florin et al. | 725/45 |
| 5,583,561 A | 12/1996 | Baker et al. | |
| 5,585,838 A | 12/1996 | Lawler et al. | |
| 5,589,892 A | 12/1996 | Knee et al. | |
| 5,596,373 A * | 1/1997 | White et al. | 725/45 |
| 5,604,528 A | 2/1997 | Edwards et al. | |
| 5,619,247 A | 4/1997 | Russo | |
| 5,619,249 A | 4/1997 | Billock et al. | |
| 5,623,613 A * | 4/1997 | Rowe et al. | 715/784 |
| 5,630,119 A | 5/1997 | Aristides et al. | |
| 5,701,383 A | 12/1997 | Russo et al. | |
| 5,721,815 A | 2/1998 | Ottesen et al. | |
| 5,790,935 A | 8/1998 | Payton | |
| 5,805,154 A | 9/1998 | Brown | |
| 5,850,218 A | 12/1998 | LaJoie et al. | |
| 5,892,535 A | 4/1999 | Allen et al. | |
| 5,973,683 A | 10/1999 | Cragun et al. | |
| 5,986,650 A * | 11/1999 | Ellis et al. | 725/40 |
| 6,049,333 A | 4/2000 | LaJoie et al. | |
| 6,065,050 A | 5/2000 | DeMoney | |
| 6,075,575 A * | 6/2000 | Schein et al. | 725/41 |
| RE36,801 E | 8/2000 | Logan et al. | |
| 6,163,272 A | 12/2000 | Goode et al. | |
| 6,177,931 B1 | 1/2001 | Alexander et al. | |
| 6,209,024 B1 | 3/2001 | Armstrong et al. | |
| 6,229,895 B1 | 5/2001 | Son et al. | |
| 6,233,389 B1 | 5/2001 | Barton et al. | |
| 6,233,607 B1 | 5/2001 | Taylor et al. | |
| 6,240,553 B1 | 5/2001 | Son et al. | |
| 6,253,375 B1 | 6/2001 | Gordon et al. | |
| 6,282,207 B1 | 8/2001 | Lerman et al. | |
| 6,314,572 B1 | 11/2001 | LaRocca et al. | |
| 6,314,573 B1 | 11/2001 | Gordon et al. | |
| 6,314,575 B1 | 11/2001 | Billock et al. | |
| 6,324,338 B1 | 11/2001 | Wood et al. | |
| 6,486,892 B1 | 11/2002 | Stern | |
| 6,505,348 B1 * | 1/2003 | Knowles et al. | 725/49 |
| 6,522,342 B1 * | 2/2003 | Gagnon et al. | 725/38 |
| 6,532,589 B1 | 3/2003 | Proehl et al. | |
| 6,564,380 B1 | 5/2003 | Murphy | |
| 6,601,237 B1 | 7/2003 | Ten Kate et al. | |
| 6,614,987 B1 | 9/2003 | Ismail et al. | |
| 6,782,550 B1 * | 8/2004 | Cao | 725/37 |
| 7,020,892 B2 | 3/2006 | Levesque et al. | |
| 7,024,678 B2 | 4/2006 | Gordon et al. | |
| 7,703,116 B1 * | 4/2010 | Moreau et al. | 725/45 |
| 7,757,252 B1 * | 7/2010 | Agasse | 725/44 |
| 2002/0032905 A1 * | 3/2002 | Sherr et al. | 725/38 |
| 2002/0054752 A1 | 5/2002 | Wood et al. | |
| 2002/0059602 A1 * | 5/2002 | Macrae et al. | 725/42 |
| 2002/0162112 A1 * | 10/2002 | Javed | 725/87 |
| 2003/0005429 A1 * | 1/2003 | Colsey | 725/39 |
| 2003/0005453 A1 | 1/2003 | Rodriguez et al. | |
| 2003/0088420 A1 * | 5/2003 | alSafadi et al. | 704/270.1 |
| 2003/0121047 A1 | 6/2003 | Watson et al. | |
| 2003/0149988 A1 | 8/2003 | Ellis et al. | |
| 2003/0154481 A1 | 8/2003 | Andersen et al. | |
| 2003/0177498 A1 | 9/2003 | Ellis et al. | |
| 2004/0068745 A1 | 4/2004 | Yamamoto et al. | |
| 2005/0204385 A1 * | 9/2005 | Sull et al. | 725/45 |
| 2005/0204389 A1 * | 9/2005 | Proehl et al. | 725/37 |
| 2005/0216940 A1 | 9/2005 | Black | |
| 2006/0085821 A9 | 4/2006 | Simmons et al. | |
| 2006/0218604 A1 | 9/2006 | Riedel et al. | |
| 2006/0253887 A1 | 11/2006 | Greene et al. | |
| 2007/0240193 A1 | 10/2007 | Sie et al. | |

OTHER PUBLICATIONS

Leibowitz, Dennis H., Interactive TV: Turning Couch Potatoes into Mouse Potatoes, Cable TV and New Media: Law & Finance, Media Law Publishing Corp., Apr. 2000, vol. XVIII, No. 1, 6 pages.

U.S. Appl. No. 09/687,149, filed Oct. 12, 2000, Office Action mailed Nov. 18, 2004, 10 pages.

U.S. Appl. No. 09/687,149, filed Oct. 12, 2000, Final Office Action mailed Aug. 12, 2005, 14 pages.

U.S. Appl. No. 09/687,149, filed Oct. 12, 2000, Office Action mailed Feb. 27, 2006, 14 pages.

U.S. Appl. No. 09/687,149, filed Oct. 12, 2000, Final Office Action mailed Jun. 30, 2006, 14 pages.

U.S. Appl. No. 09/687,149, filed Oct. 12, 2000, Office Action mailed Jan. 16, 2007, 9 pages.

U.S. Appl. No. 09/687,149, filed Oct. 12, 2000, Notice of Allowance mailed May 4, 2007, 4 pages.

U.S. Appl. No. 11/753,296, filed May 24, 2007, Office Action mailed Dec. 10, 2009, 15 pages.

U.S. Appl. No. 11/753,296, filed May 24, 2007, Final Office Action mailed Jun. 10, 2010, 15 pages.

U.S. Appl. No. 11/753,296, filed May 24, 2007, Advisory Action mailed Aug. 20, 2010, 3 pages.

U.S. Appl. No. 11/753,296, filed May 24, 2007, Notice of Allowance mailed Jan. 14, 2011, 7 pages.

U.S. Appl. No. 09/687,148, filed Oct. 12, 2000, Office Action mailed Sep. 29, 2004, 15 pages.

U.S. Appl. No. 09/687,148, filed Oct. 12, 2000, Final Office Action mailed Jun. 6, 2005, 15 pages.

U.S. Appl. No. 09/687,148, filed Oct. 12, 2000, Advisory Action mailed Aug. 31, 2005, 2 pages.

U.S. Appl. No. 09/687,148, filed Oct. 12, 2000, Office Action mailed Jan. 31, 2006, 11 pages.

U.S. Appl. No. 09/687,148, filed Oct. 12, 2000, Final Office Action mailed Jul. 11, 2006, 12 pages.

U.S. Appl. No. 09/687,148, filed Oct. 12, 2000, Notice of Allowance mailed Nov. 2, 2006, 7 pages.

U.S. Appl. No. 11/123,965, filed May 6, 2005, Office Action mailed Oct. 27, 2008, 20 pages.

U.S. Appl. No. 11/123,965, filed May 6, 2005, Office Action mailed Mar. 5, 2009, 19 pages.

U.S. Appl. No. 11/123,965, filed May 6, 2005, Office Action mailed Dec. 8, 2009, 21 pages.

U.S. Appl. No. 11/123,965, filed May 6, 2005, Final Office Action mailed Jun. 9, 2010, 23 pages.

U.S. Appl. No. 11/123,965, filed May 6, 2005, Advisory Action mailed Sep. 22, 2010, 3 pages.

U.S. Appl. No. 11/123,965, filed May 6, 2005, Office Action mailed Dec. 22, 2010, 18 pages.

* cited by examiner

LOCAL CONTEXT NAVIGATION SYSTEM

CROSS-REFERENCES TO RELATED APPLICATIONS

This application claims priority from U.S. Provisional Patent Application No. 60/678,313, filed May 6, 2005, entitled "Local Context Navigation System," and U.S. Provisional Patent Application No. 60/678,256 filed May 6, 2005, entitled "Personal Video on Demand" which are hereby incorporated by reference in their entirety, as if set forth in full in this document, for all purposes.

This application is related to U.S. patent application Ser. No. 11/123,965, filed May 6, 2005, entitled "Methods For Entertainment-Programming Distribution," which is incorporated herein in its entirety, as if set forth in full in this document, for all purposes.

BACKGROUND OF THE INVENTION

This application relates to content delivery. More specifically, this application relates to the presentation of an on-demand, context sensitive content navigation system in a client-side application.

There are a number of methods of delivering content to customers. Some such methods deliver the programming directly to an individual business or residence by using satellite, microwave, UHF, VHF, broadband Internet, or cable to a set-top box of a user. Most content is available according to a linear schedule published in programming guides. Certain additional services are available with some of these delivery systems, such as pay-per-view ("PPV"), video-on-demand ("VOD"), and near-video-on-demand ("NVOD"). A PPV service allows a user to purchase the right to play an entertainment program according to a linear schedule. A VOD service provides a user with the ability to access an entertainment-program stream at any desired time. A NVOD service is a hybrid service where an entertainment program is available on a number of different channels in a linear program with staggered start times.

Each of the PPV, VOD, and NVOD services store the program content remote from the user for delivery on a dedicated or shared channel. Both PPV and NVOD services provide programming broadcast according to a linear schedule, with multiple users sharing that single channel. In contrast, the VOD service singlecasts the program content on a dedicated channel available to a single user.

Other mechanisms for delivering content to users use physical distribution mechanisms such as digital versatile disks ("DVDs"). Typically such distribution mechanisms are provided for rent in a shop that is physically visited by a customer, who either pays for a one-time rental fee or who has a subscription package entitling the customer to borrow a certain number of the distribution mechanisms in a specified time period. More recently, such a rental model has been expanded to use conventional postal services for distribution. That is, a customer may provide a list of desired programming to a company, which mails a DVD to a customer, who watches the programming and returns the DVD by mail when complete. Upon receipt of a returned DVD, the company mails the DVD having the programming identified next on the customer's list.

BRIEF SUMMARY OF THE INVENTION

Embodiments of the invention provide methods, systems, and machine-readable media for navigating and searching a context sensitive entertainment-programming guide. According to one embodiment, a method for navigating an entertainment-programming guide can comprise establishing a connection from a client device to a server computer through a public network. A first content array can be received from the server computer over the public network. In some cases, the first content array can comprise a scripting language content array. The first content array can comprise information describing a plurality of entertainment programs. For example, the entertainment-program information can comprise graphics, icons, text, metadata, and/or links. Additionally or alternatively, the entertainment-program information can comprise video clips extracted from each of the plurality of entertainment programs. The first content array can be stored on the client device and entertainment-program information can be presented based on the first content array stored on the client device.

According to one embodiment, presenting entertainment-program information based on the first content array can comprise reading data related to a first set of elements of a user interface from the first content array. The first set of elements can comprise elements of a slider control, wherein each element represents a selectable option for navigating the plurality of entertainment programs. The slider control can be displayed on the user interface. A selection of an item of the first content array can be received based on a user selection of one of the elements of the slider control. A first query can be generated based at least in part on the selection and the first query can be sent to the server computer over the public network.

According to a further embodiment, a second content array can be received from the server computer over the public network in response to the first query. The second content array can comprise information further describing the plurality of entertainment programs. Data related to a second set of elements of a user interface can be read from the second content array. The second set of elements can comprise sub-elements of the slider control, wherein each of the sub-elements of the slider control can represent an additional, selectable option for navigating the plurality of entertainment programs. The selected element of the slider control as displayed on the user interface can expand and the sub-elements of the selected element can be displayed under the selected element of the slider control. A selection of an item of the second content array can be received based on a user selection of one of the sub-elements of the slider control. A second query can be generated based at least in part on the selection and the second query can be sent to the server computer over the public network.

According to a further embodiment, the method can further comprise receiving a third content array from the server computer over the public network in response to the second query. The third content array can comprise information further describing the plurality of entertainment programs. Data related to a third set of elements of a user interface can be read from the third content array. The third set of elements can comprise a set of content items from the plurality of entertainment programs related to the selected sub-element of the slider control. The slider control, as displayed on the user interface, can collapse and be replaced by a tab bar representing the slider control. The content items can then be displayed on the user interface. In response to a user selection of one of the content items, the selected content item can be downloaded from the server to the client over the public network. In another case, in response to a user selection of one of the content items, a preview of the selected content item can be played. Additionally or alternatively, options may be provided to rate content for use in future selections, i.e., to set user preferences maintained by either or both of the server or the client device.

According to another embodiment, a method for providing a context-sensitive entertainment-programming guide can comprise generating a content array that comprises information describing a plurality of entertainment programs. The information can comprise, for example, graphics, icons, text, metadata, and/or links. Alternatively or additionally, the information can comprise video clips extracted from each of the plurality of entertainment programs. The content array can comprise a scripting language content array. Generating the content array can comprise generating a portable format file containing the scripting language content array. For example, the portable format file can comprise an eXtensible Markup Language (XML) file. Establishment of a connection from a client device to a server computer through a public network can be identified. The content array can be transmitted from the server computer over the public network for storage on the client device. A user may search for entertainment-programming information by accessing the content array stored on the client device.

In some cases, prior to generating the content array, a query can be received from the client device. In such a case, generating the content array can comprise reading data from the query and reading a set of navigation data from pre-stored navigation data based on the data from the query. In some cases, reading the set of navigation data from pre-stored navigation data can be further based on a set of user preferences associated with the client device. A response message including the content array can be generated. Transmitting the content array from the server computer over the public network for storage on the client device can comprise transmission of the response message.

According to yet another embodiment, a method for navigating a context-sensitive entertainment-programming guide can comprise receiving a first content array from a server computer over a public network. The first content array can comprise information describing a plurality of entertainment programs. Data related to a first set of elements of a user interface can be read from the first content array. The first set of elements can comprise elements of a slider control. Code for displaying the slider control can be inserted into a first view or page of the user interface and the first view of the user interface can be displayed. The method can further comprise receiving a selection of an item of the first content array based on a user selection of one of the elements of the slider control. A first query can be generated based at least in part on the selection and the first query can be sent to the server computer over the public network.

According to a further embodiment, a second content array can be received from the server computer over the public network in response to the first query. The second content array can comprise information further describing the plurality of entertainment programs. Data related to a second set of elements of a user interface can be read from the second content array. The second set of elements can comprise sub-elements of the slider control. Code can be inserted into a second view of the user interface which causes the selected element of the slider control to expand and the sub-elements of the selected element of the slider control to be displayed under the selected element of the slider control and the second view of the user interface can be displayed. A selection of an item of the second content array can be received based on a user selection of one of the sub-elements of the slider control. A second query can be generated based at least in part on the selection and the second query can be sent to the server computer over the public network.

According to a further embodiment, a third content array can be received from the server computer over the public network in response to the second query. The third content array can comprise information further describing the plurality of entertainment programs. Data related to a third set of elements of a user interface can be read from the third content array. The third set of elements can comprise a set of content items from the plurality of entertainment programs related to the selected sub-element of the slider control. Code can be inserted into a third view of the user interface, wherein the code causes the slider control to collapse and to be replaced by a tab bar representing the slider control and the content items to be displayed. According to one embodiment, the tab bar can be persistently available to the user as a means to re-open the slider control of navigation choices. The third view of the user interface can be displayed. In response to a user selection of one of the content items, the content item can be downloaded from the server to the client over the public network. Alternatively or additionally, in response to a user selection of one of the content items, a preview of the selected content item can be played.

According to still another embodiment, a system for providing local, context-sensitive navigation of an entertainment-program guide can comprise a public network and a server communicatively coupled with the public network. The server can be adapted to generate a first content array that comprises information describing a plurality of entertainment programs and transmit the first content array over the public network. The system can also include a client device communicatively coupled with the public network. The client device can be adapted to receive the first content array from the server computer over the public network and present entertainment-program information based on the first content array stored on the client device.

The client device can be adapted to present entertainment-program information based on the first content array by reading data related to a first set of elements of a user interface from the first content array, wherein the first set of elements can comprise elements of a slider control. The slider control can be displayed on the user interface. The client device can be further adapted to receive a selection of an item of the first content array based on a user selection of one of the elements of the slider control, generate a first query based at least in part on the selection, and send the first query to the server computer over the public network.

The server computer can be further adapted to read data from the first query, read a set of navigation data from pre-stored navigation data based on the data from the first query, and generate a second content array. The second content array can comprise information further describing the plurality of entertainment programs. The second content array can be transmitted over the public network for storage on the client device.

The client device can be further adapted to receive the second content array from the server computer over the public network in response to the first query. The client device can read data related to a second set of elements of a user interface from the second content array. The second set of elements can comprise sub-elements of the slider control. The client can cause the selected element of the slider control, as displayed on the user interface, to expand and the sub-elements of the selected element to be displayed under the selected element of the slider control. The client device can be further adapted to receive a selection of an item of the second content array based on a user selection of one of the sub-elements of the slider control, generate a second query based at least in part on the selection, and send the second query to the server computer over the public network.

The server computer can be further adapted to read data from the second query, read a set of navigation data from pre-stored navigation data based on the data from the second query, and generate a third content array. The third content array can comprise information further describing the plurality of entertainment programs. The server can transmit the third content array over the public network for storage on the client device.

The client device can be further adapted to receive the third content array from the server computer over the public network in response to the query and read data related to a third set of elements of a user interface from the third content array, wherein the third set of elements comprise content items related to the sub-elements of the slider control. The client device can cause the slider control to collapse off of the user interface and to replace the slider control with a tab bar representing the slider control. The content items can then be displayed on the user interface. According to one embodiment, the tab bar can be persistently available to the user as a means to re-open the slider control of navigation choices.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral and follows a hyphen to denote one of multiple similar components. When reference is made to a reference numeral without specification to an existing sub-label, it is intended to refer to all such multiple similar components.

DETAILED DESCRIPTION OF THE INVENTION

Figure 1:
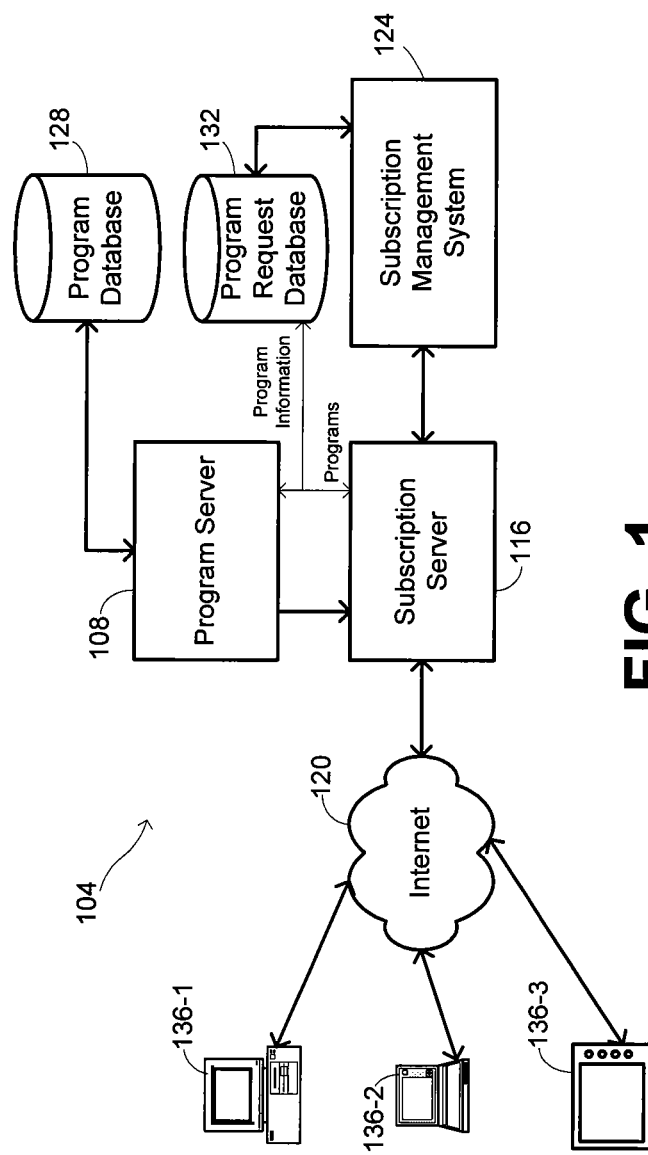
FIG. 1 is a block diagram that provides a schematic illustration of an embodiment of an entertainment-programming-distribution system.

This application describes methods and systems for navigating content over a public network, in particular for navigating entertainment-programming content in a program guide provided over the internet. As used herein, "entertainment programming" is intended to refer to a plurality of "entertainment programs," each of which is a sequence of visual images and synchronized audio produced for distribution as entertainment. Examples of entertainment programs thus include movies, television programs, concerts, sports, and the like. For convenience, "entertainment programs" are sometimes referred to herein as "programs" and/or "content," the terms intended to be synonymous.

Embodiments of the invention may be used with a programming distribution service that provides access to streamed and/or downloaded entertainment programming over a public network like the Internet. Generally speaking, embodiments of the present invention provide for distributing a content array that defines or describes a variety of available entertainment programs. These content arrays can be dynamically generated based on any number of possible context-sensitive factors and sent to a client for use in displaying a user interface to a user of the client. The user interface can provide views of the available content based on the content array and allow the user to browse, search, preview, and/or navigate the content.

A detailed description of a programming distribution service that may be used with embodiments of the present invention is provided in the related application entitled "Methods For Entertainment-Programming Distribution" cited above. Such a system may include a structure such as shown schematically in FIG. 1. The programming distribution system 104 can include a subscription server 116 interfaced with a public network 120 such as the Internet, a program server 108, and a subscription management system 124. Program information is stored in a program database 128 and program-request information can be stored in a program-request database 132. Customers can interface with the system using computers 136 interfaced with the public network 120. The customer computers 136 may comprise a desktop computer 136-1 a portable computer 136-2 such as a laptop, with the portability provided by the portable computer 136-2 conveniently permitting downloaded content to be moved to different locations, or may comprise a personal media player 136-3. Other devices and/or types of devices may also be used to download and present content and context-sensitive navigation information. For example, a client device can be a television, with or without a set-top box, a game console, a portable wireless device, a cell phone, etc. As used herein, the terms client, client computer, and client device, are used interchangeable and are intended to be synonymous and refer to any device capable of communicating via a wired or wireless connection to receive entertainment program content and context sensitive navigation information as described herein.

The subscription management system 124 can coordinate overall management of customer subscriptions to the downloading service. In addition, interactive screens for selecting services can be formulated, for example, by the subscription management system 124. As will be seen, various user interface screens allow the customer to select entertainment programming available, for example, via the program server 108. According to one embodiment, the subscription management system can provide filtered content and services that are only available to subscribers. The subscription server 116 can store content that is provided for distribution over the public network 120. Programs can be stored in compressed digital form.

For example, MPEG-4 compression can be used, although this is not a requirement of the invention and other algorithms such as MPEG-2, VC-1, WindowsMedia, RealVideo, or QuickTime may be used for compressing the program content. The programs may be downloaded from a program database 128 by a program server 108 or may be provided on removable storage media such as tapes or disks. Additionally, real-time content may be provided over the public network 120 as part of a simulcast service.

The subscription management system 124 and/or the subscription server 116 may store customer-specific information and programming information. The customer-specific information can include such information as name, address, IP address, membership history, available credit, and the like, as well as a history of programs that have been downloaded by each customer, specifying each program, when it was downloaded, etc. Programming information includes such information as schedules for simulcast programming distribution, program descriptions, special programming collections, and the like. The program-request database 132 may store, for example, parental control information that restricts the type of programs that may be downloaded according to content classifications and customer specifications. Both the program server 108 and the subscription management system 124 may interact with the program-request database 132. For example, the program server 108 may provide information to the program-request database 132 when programming is downloaded to manage compliance with subscription requirements and to provide information that may be used for customer billing and the like. The program-request database 132 and program server 108 may be used for formulating menu screens presented to the user. For example, a customer might wish to know his account balance or to review a history of programs that have previously been downloaded. This usage information is stored in the program-request database 132 and used by the subscription management system 124 in administering the system.

Program server 108, in conjunction with program database 128 and program request database 132, may also provide, for example by providing an Application Program Interface (API) to the client device 136, content information that may be used by a customer to determine which programs may be made available, when the programs will be available, as well as to be informed about the content of the programs. The content information may include descriptive information such as narrative text about the plot of the program, a listing of actors, director, and other creative and production staff who created the program, a rating of the program including content designations to identify potentially offensive material, critical reviews of the program, key art, bonus materials, and the like. The content information may also conveniently include clips of the program that may be reviewed by the customer when deciding which programs to view or to download.

The basic arrangement of the system described in connection with FIG. 1 is a client/server model in which the customer computers 136 act as clients to the subscription server 116. One disadvantage with client/server models occurs when a typical server-side presentation is used, in which pages are served up by the server one at a time. This leads to latencies in which users must wait for a request to be issued over the network to the server and must wait for a response to be returned in order to view a new page. In addition, any searching functions for content within the system must be requested and processed on the server, leading to further responsiveness delays.

Such delays are mitigated in embodiments of the invention by downloading a scripting-language content array to the client from the server when a page is accessed, thereby allowing for much quicker and more responsive navigation of an entertainment-programming guide. This is especially advantageous when the computer 136 is connected with the public network 120 with a high-speed connection so that downloading the content array may be performed without significant delay, while permitting delays from transfers back to the server during navigation of the entertainment-programming guide to be reduced. In one specific embodiment, the content array comprises an array that can be provided in an of a number of portable formats such as, for example, an extensible Markup Language (XML) file.

Figure 2:
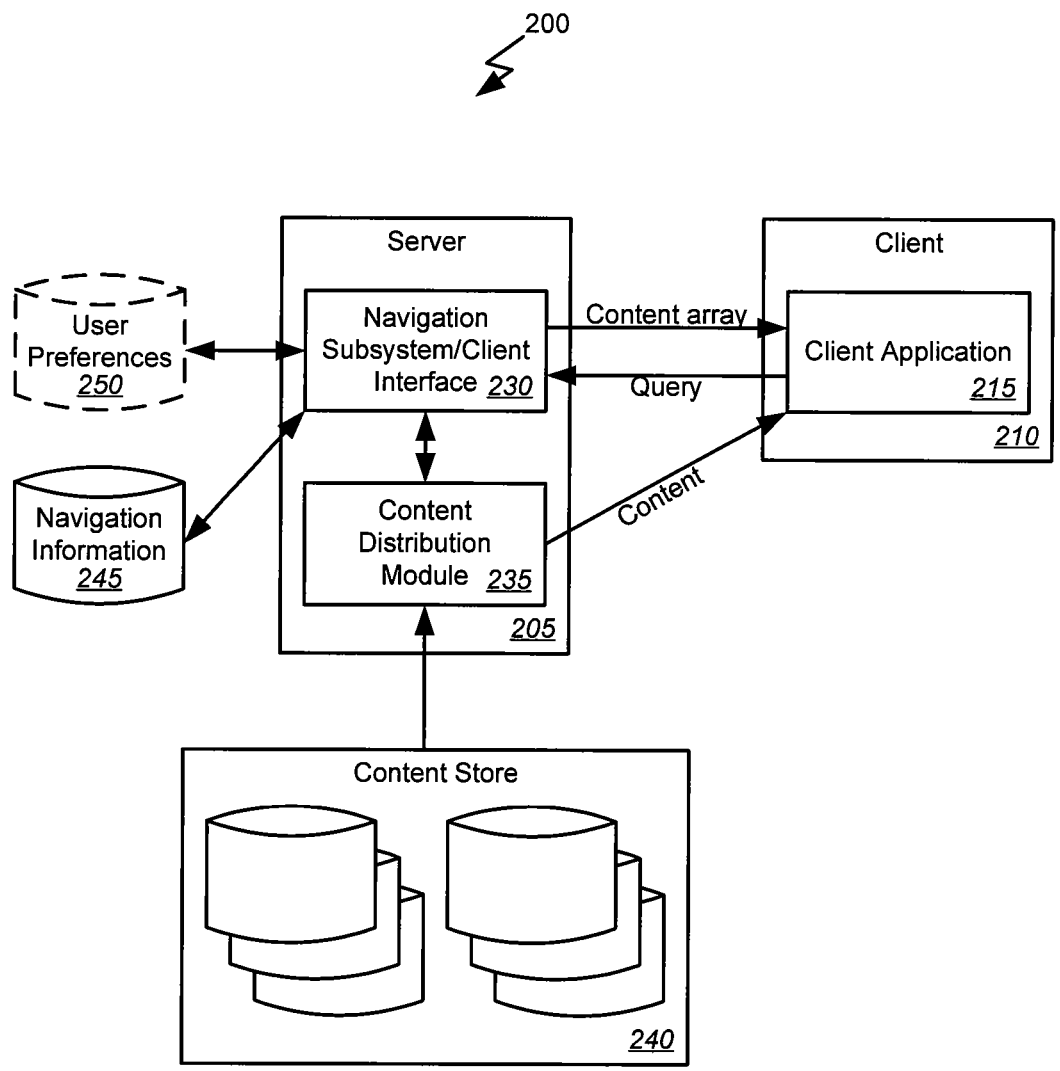
FIG. 2 is a block diagram illustrating functional components of a system for providing local, context-sensitive navigation of an entertainment-program guide according to one embodiment of the present invention.

FIG. 2 is a block diagram illustrating functional components of a system for providing local, context-sensitive navigation of an entertainment-program guide according to one embodiment of the present invention. In this example, the system 200 includes a server 205 such as subscription server 116 and/or program server 108 described above. As noted above, such a server may be communicatively coupled with a public network 120 such as the Internet (not shown here). The system 200 can also include a client device 210 such as the client computers 136 described above. Also, as noted above, the client 210 can be communicatively coupled with the public network (not shown here) for communicating with the server 205.

The client 210 can include a client application 215 for interacting with the server 205. The client application 215 may be downloaded from the server 205 to the client 210, distributed by on computer-readable medium by the content provider, or by other means. The client application 215 may be a dedicated application for interacting with the server 205 or may be another, common application such as a web browser.

The server 205 can include a navigation subsystem and/or client interface 230 for communicating and interacting with the client application 215 and a content distribution module 235 for providing, downloading, streaming, etc. any number of entertainment programs stored in a content store 240 such as program database 128 described above. According to one embodiment, the navigation subsystem and/or client interface 230 can comprise an API accessible by the client application 215 of the client device 210. Importantly, while shown here as separate from the server 205, it should be noted that the content store 240 may be part of or separate from the server. Furthermore, while shown here as separate components, it should be understood that the navigation subsystem and/or client interface 230 and the content distribution system 235 may be implemented as one or many different components depending upon the nature of implementation.

To provide local, context-sensitive navigation of an entertainment-program guide, the server 205, via the navigation subsystem and/or client interface 230, can be adapted to generate a content array that comprises information describing a plurality of entertainment programs available in the content store 240. The content array may be generated based on a number of criteria including, but not limited to, information passed to the server 205 from the client application 215 via a query or other request message, information related to user preferences 250 for the client 210 or user of the client 210, navigation information 245 related to entertainment programs in the content store 240, etc. Additional details of the content array and generation thereon will be discussed further below.

The server 205 can transmit the content array over the public network to the client 210. The client device 210 can be adapted to receive the content array from the server computer 205 and present entertainment-program information based on the content array. For example, the client device 210 can be adapted to present entertainment-program information based on the content array by reading data related to elements of a user interface from the first content array and displaying the user interface with the elements indicated by the content array. The client device 210 can be further adapted to receive a selection of an item of the content array based on a user selection of one of the elements of the user interface and send a query to the server computer 205 to request an entertainment program, additional navigation information, etc. Additional details of the client processes and an exemplary user interface will be discussed below.

Figure 3:
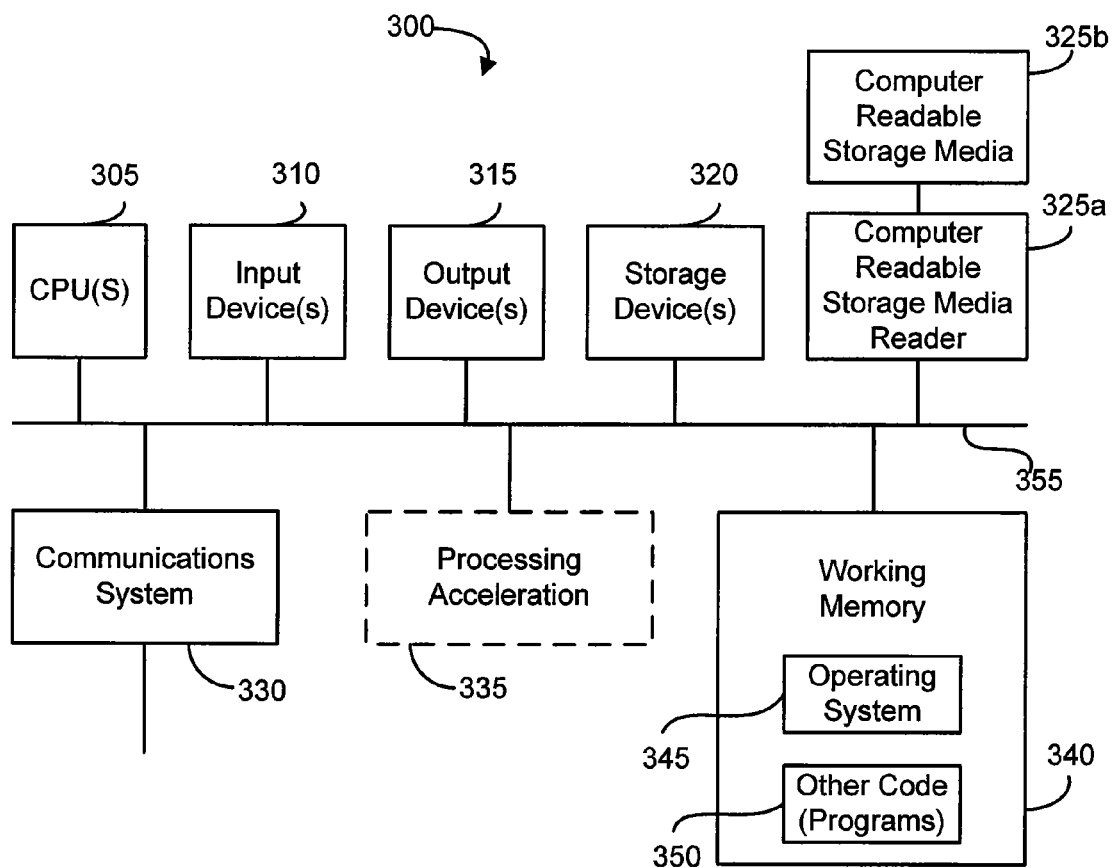
FIG. 3 is a block diagram illustrating an exemplary computer system upon which embodiments of the present invention may be implemented.

FIG. 3 is a block diagram illustrating an exemplary computer system upon which embodiments of the present invention may be implemented. The computer system 300 is shown comprising hardware elements that may be electrically coupled via a bus 355. The hardware elements may include one or more central processing units (CPUs) 305; one or more input devices 310 (e.g., a scan device, a mouse, a keyboard, etc.); and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device (s) 320) comprehensively representing remote, local, fixed, and/or removable storage devices plus storage media for temporarily and/or more permanently containing computer-readable information. The communications system 330 may permit data to be exchanged with a network and/or any other computer or other type of device.

The computer system 300 may also comprise software elements, shown as being currently located within a working memory 340, including an operating system 345 and/or other code 350, such as an application program. The application programs may implement components of the methods of the invention. For example, the application programs may provide function of the client application 215, navigation subsystem and/or client interface 230, or other components of the server 205 and/or client 210 as discussed herein. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Figure 4:
FIG. 4 illustrates an exemplary user interface for providing local, context-sensitive navigation of an entertainment-program guide according to one embodiment of the present invention.

FIG. 4 illustrates an exemplary user interface for providing local, context-sensitive navigation of an entertainment-program guide according to one embodiment of the present invention. This example illustrates the interface 400 of the Vongo$^{SM}$ service provided by Starz Entertainment Group, LLC. However, it should be noted that this interface is provided by way of example only and not limitation. Other interfaces for providing local, context-sensitive navigation of an entertainment-program guide as described herein are also contemplated and considered to be within the scope of the present invention.

The interface 400 illustrated in FIG. 4 includes a main display area 405, a preview area 410, a recommendations area 415, a library area 420, and a slider control 430. The main display area 405 can include any of a variety of information such as advertising as shown here or navigation information as will be seen. The preview area 410 can be used to display service programs and promotions or can be used to play a preview or trailer of an entertainment program selected from elsewhere on the interface 400. The recommendations area 415 can be used to provide links to entertainment programs that may be determined to be of interest to the user based on past usage, preference information, or other criteria. The library area 420 can be used to display links to content that has already been downloaded to the client device. Finally, the slider control 425 can be used to provide one or more categories 430 or elements for browsing, navigating or searching available content, i.e., entertainment programs.

More specifically, the slider control 425 includes a number of selections or elements 430 that, as will be seen, can relate to entries in the content array sent to the client device from the server. Furthermore, the slider control 425 can include a bracket 435 or other indication for highlighting an element such as when a user hovers or moves a cursor or other indication over that element by, for example, manipulating a mouse, trackball, keyboard, or other input device.

According to one embodiment, when a user selects one of the elements 430 of the slider control 425, such as clicking a mouse button, keyboard key, etc., the slider control 425 or other portions of the interface 405 can be changed to present additional navigation information or content related to the selected element. For example, if the user, by manipulating the mouse or other pointing device, moves the cursor over the "ALL MOVIES" element 430 of the slider control 425 and clicks to select that element, additional details of the "ALL MOVIES" element can be provided for further navigation.

Figure 5:
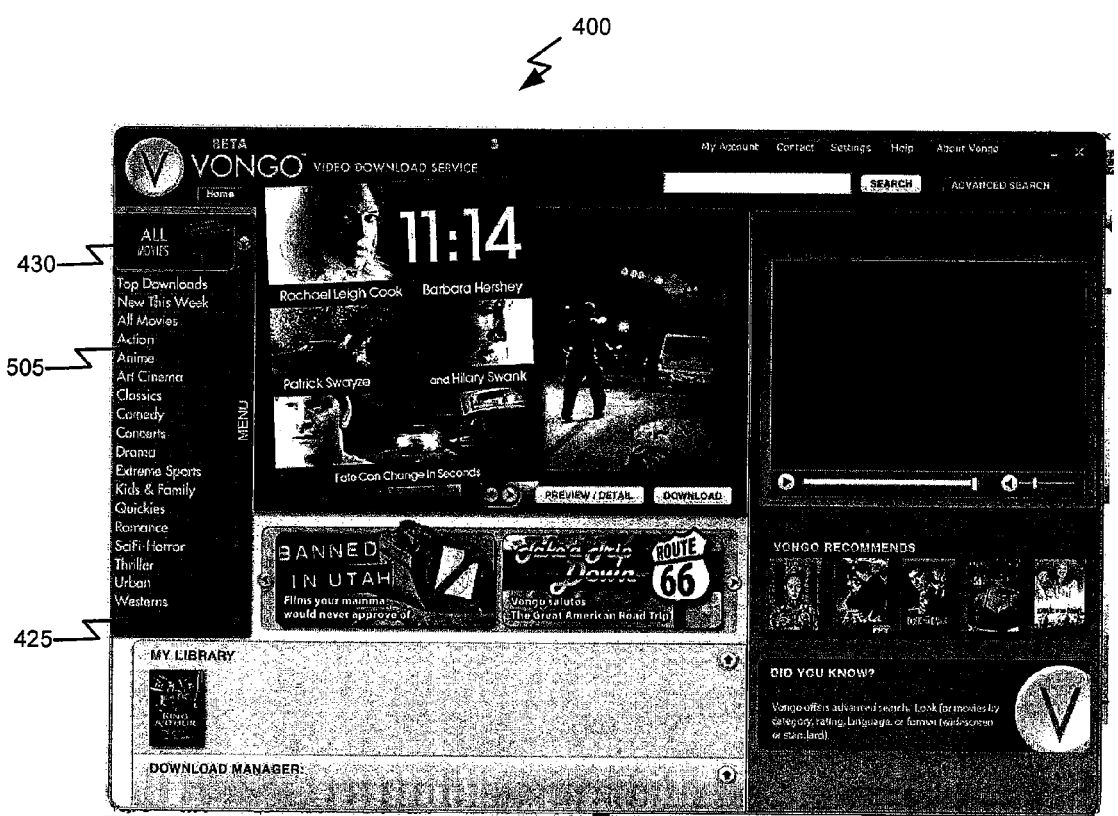
FIG. 5 illustrates a further view of the exemplary user interface of FIG. 4 according to one embodiment of the present invention.

FIG. 5 illustrates a further view of the exemplary user interface of FIG. 4 according to one embodiment of the present invention. This example illustrates the slider control 425 after one of the elements, the "ALL MOVIES" element, has been selected. In this example, the selected "ALL MOVIES" element has been moved to the top of the slider control 425 and a list of sub-elements 505 related to the selected "ALL MOVIES" element has been displayed in a list underneath the "ALL MOVIES" element 430, replacing or partially replacing the other elements of the slider control 425. In this way, the selected element 430 of the slider control 425 appears to have expanded to include related sub-elements 505.

According to one embodiment, when a user selects one of the sub-elements of the slider control 425, such as clicking a mouse button, keyboard key, etc., the slider control 425 and/or other portions of the interface 405 can be changed to present additional navigation information or content related to the selected sub-element. For example, if the user, by manipulating the mouse or other pointing device, moves the cursor over the "Action" sub-element of the slider control 425 and clicks to select that sub-element, additional details of the "Action" sub-element can be provided for further navigation.

Figure 6:
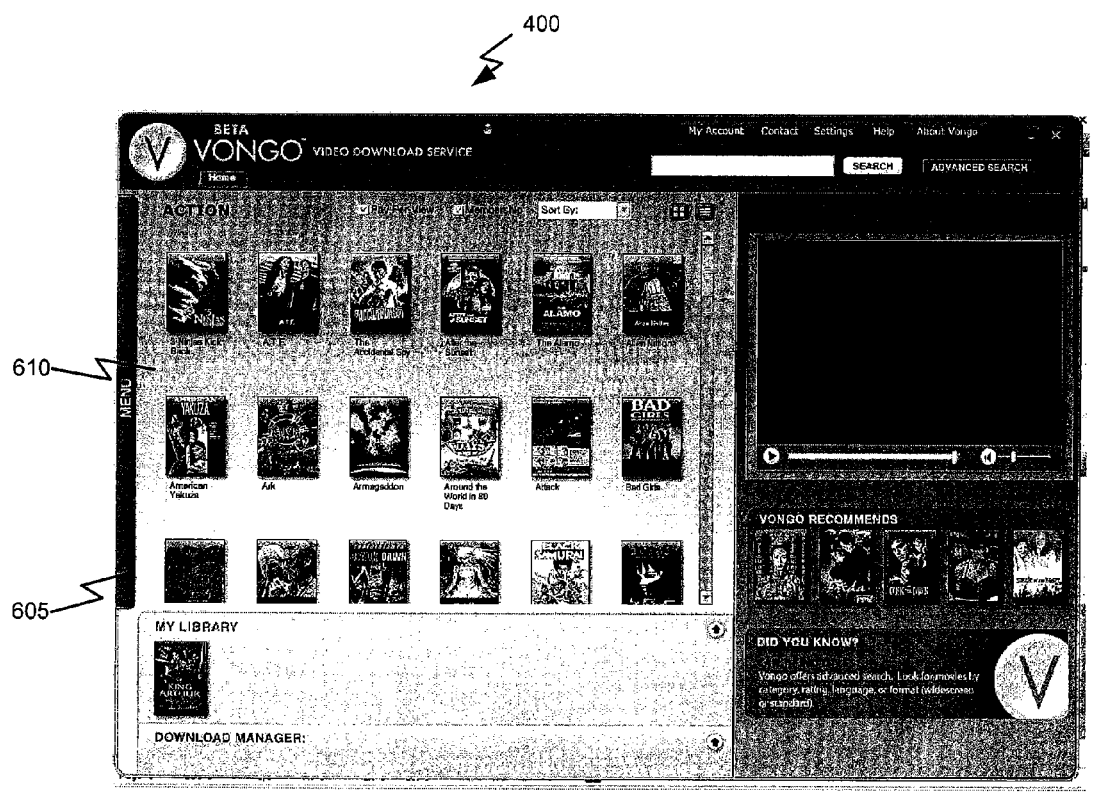
FIG. 6 illustrates yet another view of the exemplary user interface of FIG. 4 according to one embodiment of the present invention.

FIG. 6 illustrates yet another view of the exemplary user interface of FIG. 4 according to one embodiment of the present invention. This example illustrates the slider control 425 and interface 400 after one of the sub-elements of the "ALL MOVIES" element, has been selected. In this example, the slider control has been replaced by a tab bar 605. In this way, the slider control 425 appears to have collapsed into or moved off of the left side of the interface 405. Furthermore, the main display area 405 appears to have been expanded. The expanded main display area 405 now includes a number of links or other indications of available content items 610, i.e., entertainment programs, related to the selected sub-element. These indications can include a graphical, textual, and/or other representation of the content item 610 as well as links or other controls for downloading, previewing, or obtain additional information related to the content item 610. According to one embodiment, the tab bar 605 can be persistently available to the user as a means to re-open the slider control of navigation choices.

According to one embodiment, when a user selects one of the content items 610, such as clicking a mouse button, keyboard key, etc., the selected content item can be downloaded. Alternatively or additionally, selecting the content item or a "Preview" link or other control can cause a preview of the content item to be played. In some cases, a user may be required to purchase the content prior to download, streaming, previewing, etc. According to one embodiment, a user may also be able to rate the content for storage by the client device and/or the server in the form of user preferences for later use in presenting content.

The exemplary interface 400 presented in FIGS. 4-6 can be generated by the client application 215 or alternatively may be provided by the server 205 in the form of a web page. In either case, the elements, sub-elements, and/or content items can be generated by the client based on the information contained in the content array. Furthermore, the information in the content array can be dynamically generated by the server based on the current context of the navigation information presented by the interface and/or other information such as user preferences etc.

Figure 7:
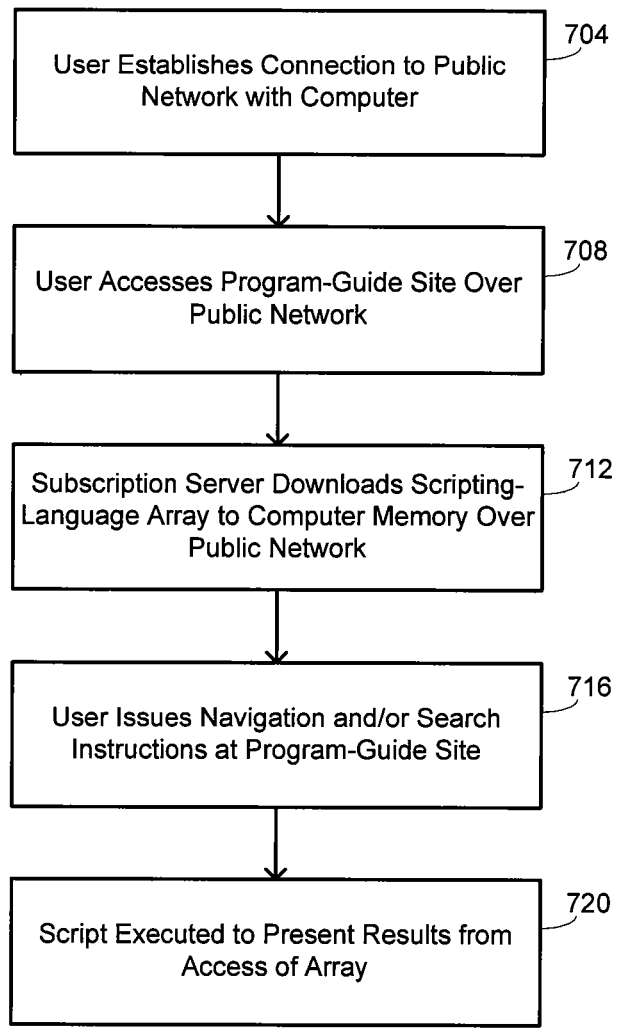
FIG. 7 is a flow diagram illustrating a process for local, context-sensitive navigation of an entertainment-program guide according to one embodiment of the present invention.

FIG. 7 is a flow diagram illustrating a process for local, context-sensitive navigation of an entertainment-program guide according to one embodiment of the present invention. In this example, at block 704, a user establishes a connection with the public network 120 with her computer 136. A program-guide site is accessed by the user at block 708 over the public network 120, and the subscription server 116 downloads a scripting-language content array, such as a JavaScript array, to the computer's memory over the public network 120 at block 712. The content array may include graphics, icons, text, metadata, links, etc. The user may then issue navigation and/or search instructions at the program-guide site, as indicated at block 716. These navigation and/or search instructions are executed with a script, such as one written in JavaScript, to return results from access of the content array. That is, the method enables the user to perform navigation and searching functions while connected with a single site, such as defined by a URL when the public network comprises the Internet 120 by moving a mouse or other pointer device to different areas of the page.

The currency of the information available to the user may be maintained by checking each time the user computer 136 accesses the site whether the content array has been updated since that user computer last accessed the site. If the content array has been updated, the new version can be downloaded to the user computer to overwrite the earlier version. In some instances, the form that the content array is to take several weeks in the future may already be known, as schedules for programming distribution have already been fixed. In such cases, multiple versions of the content array that will be current at certain future times may conveniently be downloaded so that the user computer 136 is already equipped to perform navigation and searching functions when those schedules are applicable.

One example of a structure for the content array is provided in Table I. The array structure is defined by the content of each of multiple fields ("Field Type"), the type of data stored in that field ("Data Type"), and the size of the field ("Data Size").

TABLE I

Exemplary Content Array Structure

| Field Title | Data Type | Data Size |
|---|---|---|
| Long title | Alphanumeric | 64 characters |
| Short title | Alphanumeric | 32 characters |
| Studio | Alphanumeric | 32 characters |
| Actor 1 | Alphanumeric | 32 characters |
| Actor 2 | Alphanumeric | 32 characters |
| Actor 3 | Alphanumeric | 32 characters |
| Actor 4 | Alphanumeric | 32 characters |
| Release Year | Alphanumeric | 8 characters |
| Parental Rating | Alphanumeric | 8 characters |
| Long Description | Alphanumeric | 256 characters |
| Short Description | Alphanumeric | 128 characters |
| Box Art | Graphics (JPEG) | 32k byte |
| Icon | Graphics (JPEG) | 8k byte |
| Start Date | Alphanumeric MM-DD-YYYY | 8 characters |
| End Date | Alphanumeric MM-DD-YYYY | 8 characters |
| Genre 1 | Alphanumeric | 16 characters |
| Genre 2 | Alphanumeric | 16 characters |
| Genre 3 | Alphanumeric | 16 characters |
| Genre 4 | Alphanumeric | 16 characters |
| Copy Control Info | Unsigned Integer | 2 bytes |

One example of a navigation file that may be used in one embodiment is the following:

```
/*
 * Generated by Asset Manager on 07/23/2004 09:44 AM
 * type: LIVE
 * endBuff: -1
 * partnerCode: Network RN
 *
 * movie count: 113
 */
function Movies( ) {
m = new Array( );
m[0] = new movie("Pirates of the Caribbean: The Curse Of The Black Pearl:
On The Set","Behind the scenes look at the making of The Pirates of the
Caribbean featuring Johnny Depp and Geoffrey Rush.","TV-
PG","2003","","","Action, Starz Extras","2003 ENCORE MEDIA
PRODUCTIONS","All Movies|","14 minutes", "06/07/2004", "08/01/2004",
"On_The_Set_Pirates_Of_The_Caribbean_1Photo.jpg",
```

Figure 8:
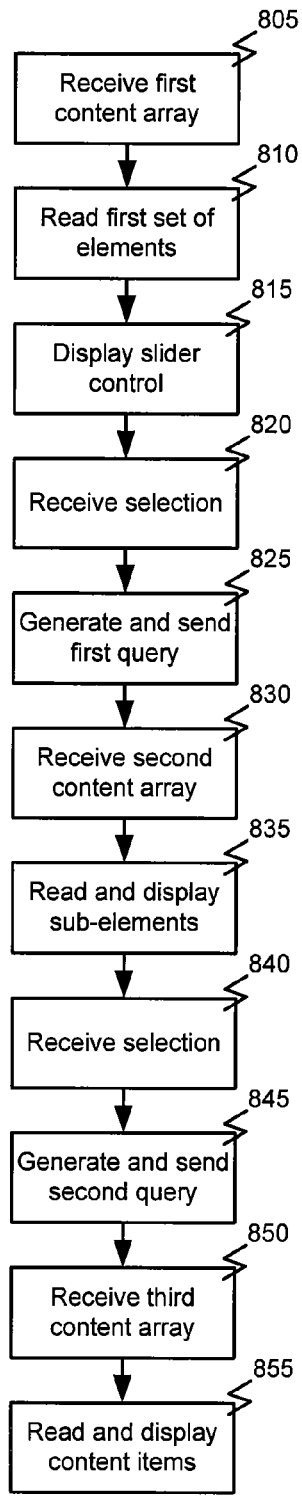
FIG. 8 is a flowchart illustrating details of a client process for providing local, context-sensitive navigation of an entertainment-program guide according to one embodiment of the present invention.

"On_The_Set_Pirates_Of_The_Caribbean_1.rmp",
"On_The_Set_Pirates_Of_The_Caribbean_1Promo.rm", "000000056923-20040607","34cc26fb-941f-49bb-b20f-ad1ca6f21439");
m[1] = new movie("Pirates Of The Caribbean: The Curse Of The Black Pearl","Johnny Depp stars as the infamous pirate Jack Sparrow, who teams up with a noble blacksmith to rescue the governor's daughter and stop the evil plan of Sparrow's former mates, who've fallen under an ancient curse that leaves them stuck between life and death.","PG-13","2003","Gore Verbinski", "Johnny Depp, Geoffrey Rush, Orlando Bloom, Jack Davenport", "Action, Top Picks", "DISNEY ENTERPRISES, INC.", "All Movies!", "2 hr 23 mins","06/07/2004","08/01/2004","Pirates_Of_The_Caribbean_3Photo.jpg", "Pirates_Of_The_Caribbean_3.rmp", "Pirates_Of_The_Caribbean_3Promo.rm", "000000054625-20040607", "124c9052-a3b0-461c-9899-cdf1d2d6c3e9");
m[2] = new movie("Freaky Friday","Jamie Lee Curtis and Lindsay Lohan star in this remake of the Disney classic in which a mother and daughter who don't see eye-to-eye wake up one morning and discover they have magically switched bodies.", "PG", "2003", "Mark Waters", "Jamie Lee Curtis, Lindsay Lohan, Mark Harmon, Chad Michael Murray", "Kids & Family, Top Picks", "2003 DISNEY ENTERPRISES, INC. ALL RIGHTS RESERVED.", "All Movies!","1 hr 36 mins", "06/21/2004", "08/15/2004", "Freaky_Friday_Photo.jpg", "Freaky_Friday.rmp", "Freaky_Friday_Promo.rm", "000000056585-20040621", "aa150d5d-6402-437e-b4e8-05b5936cb3bd");

FIG. 8 is a flowchart illustrating details of a client process for providing local, context-sensitive navigation of an entertainment-program guide according to one embodiment of the present invention. In this example, processing begins with receiving a first content array 805. Data related to a first set of elements of a user interface can be read 810 from the first content array. The first set of elements can comprise elements of a slider control, wherein each element represents a selectable option for navigating the plurality of entertainment programs. The slider control can be displayed 815 on the user interface. A selection of an item of the first content array can be received 820 based on a user selection of one of the elements of the slider control. A query can be generated 825 based at least in part on the selection and the query can be sent to the server computer over the public network.

According to a further embodiment, a second content array can be received 830 from the server computer over the public network in response to the query. The second content array can comprise information further describing the plurality of entertainment programs. Data related to a second set of elements of a user interface can be read 835 from the second content array. The second set of elements can comprise sub-elements of the slider control, wherein each of the sub-elements of the slider control can represent an additional selectable option for navigating the plurality of entertainment programs. The selected element of the slider control as displayed on the user interface can expand and the sub-elements of the selected element can be displayed under the selected element of the slider control. A selection of an item of the second content array can be received 840 based on a user selection of one of the sub-elements of the slider control. A query can be generated 845 based at least in part on the selection and the query can be sent to the server computer over the public network.

According to a further embodiment, the method can further comprise receiving 850 a third content array from the server computer over the public network in response to the query. The third content array can comprise information further describing the plurality of entertainment programs. Data related to a third set of elements of a user interface can be read 855 from the third content array. The third set of elements can comprise a set of content items from the plurality of entertainment programs related to the selected sub-element of the slider control. The slider control can collapse off of the user interface and be replaced by a tab bar representing the slider control. The content items can then be displayed on the user interface. In response to a user selection of one of the content items, the selected content item can be downloaded from the server to the client over the public network. In another case, in response to a user selection of one of the content items, a preview of the selected content item can be played.

Importantly, it should be noted that the process illustrated in FIG. 8 represents only one possible flow as a user navigates the user interface. That is, FIG. 8 represents a process in which the user navigates from one to another of three vies or pages of the user interface. In another example, the user may select the tab bar to cause the slider control to reappear. In another example, the user may play content previously downloaded and represented in the library portion of the interface. In yet another example, the user may select content represented in the main portion or another portion of the interface before navigating through all three views or pages as shown in FIG. 8. Therefore, the process of FIG. 8 is offered for illustrative purposes only and not by way of limitation.

Figure 9:
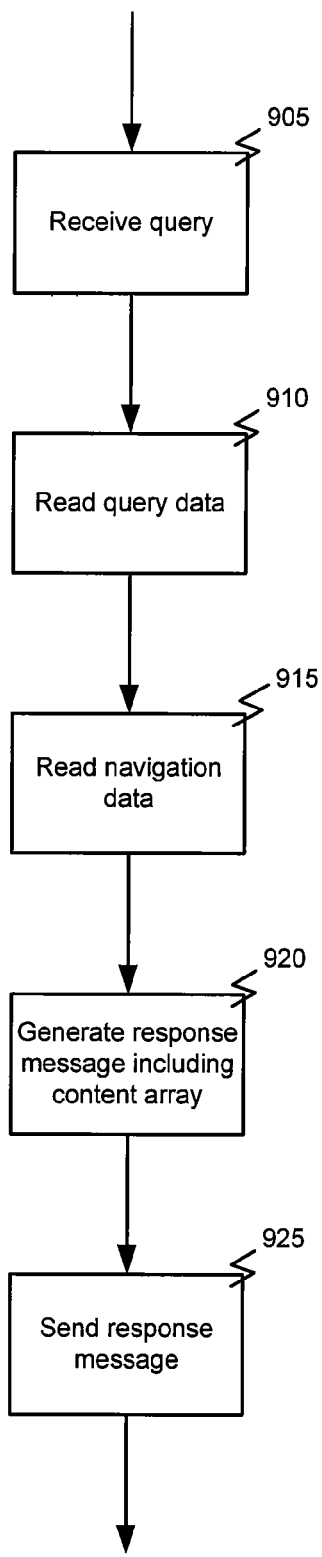
FIG. 9 is a flowchart illustrating details of a server process for providing local, context-sensitive navigation of an entertainment-program guide according to one embodiment of the present invention.

FIG. 9 is a flowchart illustrating details of a server process for providing local, context-sensitive navigation of an entertainment-program guide according to one embodiment of the present invention. The process can begin in some cases, as shown here, with receiving 905 a query from the client device. In such a case, generating the content array can comprise reading 910 data from the query and reading 915 a set of navigation data from pre-stored navigation data based on the data from the query. In some cases, reading the set of navigation data from pre-stored navigation data can be further based on a set of user preferences associated with the client device.

A response message including the content array can be generated 920. A content array can be generated that comprises information describing a plurality of entertainment programs. The information can comprise, for example, graphics, icons, text, metadata, and/or links. Alternatively or additionally, the information can comprise video clips extracted from each of the plurality of entertainment programs. The content array comprises a scripting language content array. Generating the content array can comprise generating a portable format file containing the scripting language content array. For example, the portable format file can comprise an eXtensible Markup Language (XML) file. Establishment of a connection from a client device to a server computer through a public network can be identified. The response message with the content array can be sent 925 from the server computer over the public network for storage on the client device.

According to another embodiment, the content array can be transmitted from the server computer over the public network for storage on the client device. A user may search for entertainment-programming information by accessing the content array stored on the client device.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for navigating an entertainment-programming guide, the method comprising:
    establishing a connection from a client device to a server computer through a public network;
    receiving a first dynamic content array at the client device from the server computer over the public network;
    determining, upon each access of the server computer, whether the first dynamic content array has been updated since a previous access of the server computer, and overwriting the first dynamic content array if a new version is available, the first dynamic content array comprising:
        descriptive information comprising text displayable in a program guide describing a plurality of entertainment programs available from a download service,
        video information comprising one or more video clips playable by the client device, the video information being associated with at least one of the plurality of entertainment programs,
        element information associated with a first set of elements to be displayed in a first display of a user interface, the first set of elements each associated with a respective first portion of the plurality of entertainment programs, and
        sub-element information pertaining to sub-elements associated with at least one of the first set of elements, the sub-elements to be displayed in a second display of the user interface, the sub-elements each associated with a respective sub-portion of one of the first portions of the plurality of entertainment programs;
    storing the first dynamic content array on the client device, including the descriptive information, the video information, the element information, and the sub-element information;
    presenting entertainment-program information with the client device based on the first dynamic content array stored on the client device by displaying the first display of the user interface, the first display comprising:
        a main display area;
        a preview area for displaying the one or more video clips;
        a recommendation area displaying links to content determined to be of interest based on past usage or preference information; and
        a library area displaying indications of content that has already been downloaded to the client device;
    receiving an indication of selection of a first element of the first set of elements displayed in the first display;
    in response to receiving the indication:
        retrieving a portion of the sub-element information associated with the first element from the stored first content array; and
        displaying the second display of the user interface based on the retrieved sub-element information.

2. The method recited in claim 1, wherein the entertainment-program information comprises graphics, icons, text, metadata, and links.

3. The method recited in claim 1, wherein the one or more video clips comprise scenes extracted from each of the plurality of entertainment programs.

4. The method of claim 1, wherein the first dynamic content array comprises a scripting language content array.

5. The method of claim 1, wherein presenting entertainment-program information based on the first dynamic content array comprises reading data related to the first set of elements from the first dynamic content array, wherein the first set of elements comprises elements of a slider control, wherein each element of the first set of elements represents a selectable option for navigating the plurality of entertainment programs.

6. The method of claim 5, further comprising displaying the slider control on the first display of the user interface.

7. The method of claim 6, further comprising:
    in response to receiving the indication of the selection of the first element, generating a first query with the client device based at least in part on the indication of the selection; and
    sending the first query from the client device to the server computer over the public network.

8. The method of claim 7, further comprising receiving a second dynamic content array at the client device from the server computer over the public network in response to the first query, the second dynamic content array comprising information further describing the sub-portions of entertainment programs associated with the sub-elements associated with the first element.

9. The method of claim 8, further comprising, reading data related to the sub-elements associated with the first element of the user interface from the second dynamic content array with the client device, wherein each of the sub-elements represents an additional selectable option of the slider control for navigating the plurality of entertainment programs.

10. The method of claim 9, further comprising:
    causing with the client device the selected first element of the slider control as displayed in the first display on the user interface to expand into the second display; and displaying with the client device the sub-elements of the selected first element in the second display under the selected first element of the slider control.

11. The method of claim 10, further comprising:
receiving a selection of an item of the second dynamic content array at the client device based on a user selection of one of the sub-elements of the slider control;
generating a second query with the client device based at least in part on the selection; and
sending the second query from the client device to the server computer over the public network.

12. The method of claim 11, further comprising receiving a third dynamic content array at the client device from the server computer over the public network in response to the second query, the third dynamic content array comprising information further describing the plurality of entertainment programs.

13. The method of claim 12, further comprising, reading data related to a third set of elements of the user interface from the third dynamic content array with the client device, wherein the third set of elements comprise a set of content items from the plurality of entertainment programs related to the selected sub-element of the slider control.

14. The method of claim 13, further comprising:
causing with the client device the slider control to collapse off of the user interface and to be replaced by a tab bar representing the slider control; and
displaying with the client device the content items on the user interface.

15. The method of claim 14, further comprising, in response to a user selection of one of the content items, downloading the selected content item from the server to the client device over the public network.

16. The method of claim 14, further comprising, in response to a user selection of one of the content items, playing a preview of the selected content item with the client device.

17. The method of claim 1, wherein:
the first set of elements comprises categories of movies;
the at least one of the first set of elements comprises movies available from a particular content provider; and
the sub-elements comprise sub-categories of movies that are available from the particular content provider.

\* \* \* \* \*